Feb. 21, 1928. 1,659,868
W. W. GILDERSLEEVE
SAW TOOL
Filed Dec. 4, 1925 2 Sheets-Sheet 1
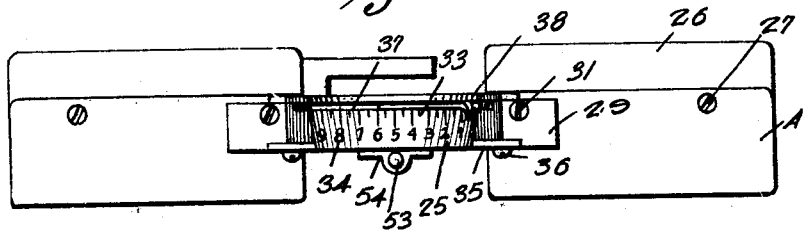
Fig. 1.
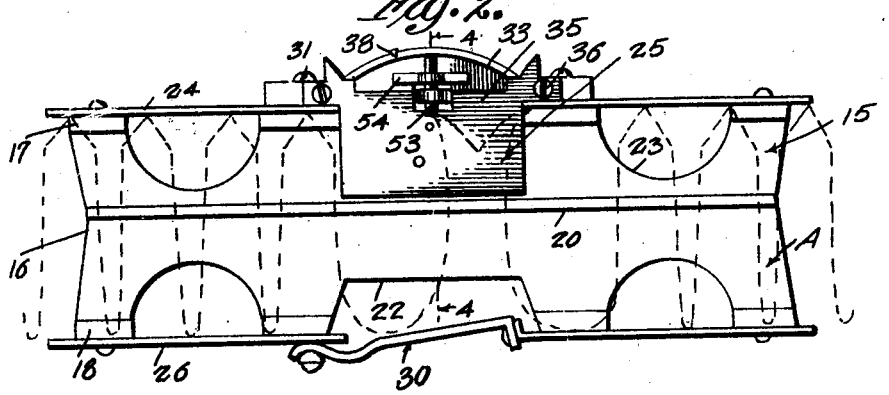
Fig. 2.
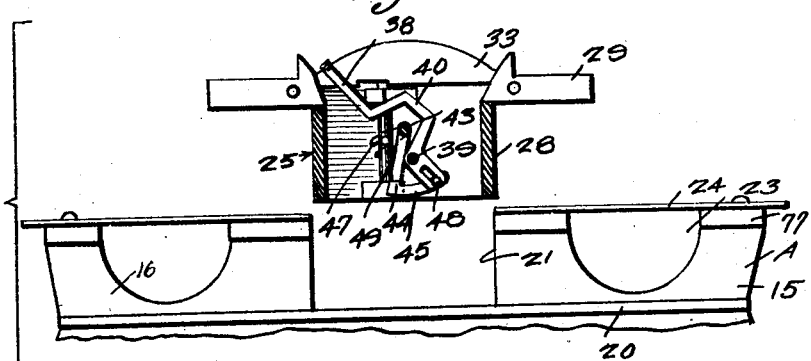
Fig. 3.
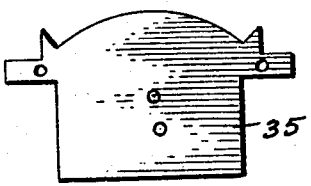
Inventor
WILLIS W. GILDERSLEEVE
WITNESSES
By
Attorney Feb. 21, 1928.
W. W. GILDERSLEEVE
1,659,868
SAW TOOL
Filed Dec. 4, 1925
2 Sheets-Sheet 2
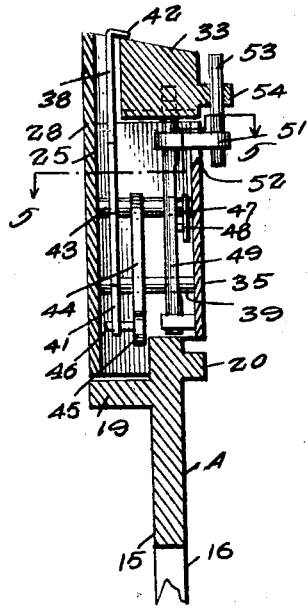
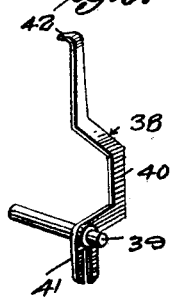
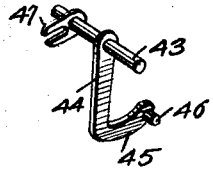
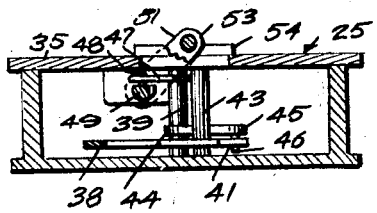
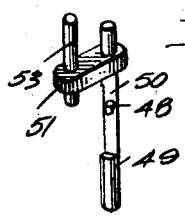
WITNESSES.
Inventor
WILLIS W. GILDERSLEEVE
By Attorney Patented Feb. 21, 1928.

1,659,868

UNITED STATES PATENT OFFICE.

WILLIS W. GILDERSLEEVE, OF OCEAN FALLS, BRITISH COLUMBIA, CANADA.

SAW TOOL.

Application filed December 4, 1925. Serial No. 73,243.

This invention relates to saws and more particularly to a novel raker tooth gage.

The primary object of the present invention is to provide a novel raker tooth gage for facilitating the accurate swaging of the teeth, the gage being so constructed as to show the exact height of the teeth, whereby each tooth can be easily swaged.

Another object of the invention is the provision of a novel raker tooth gage embodying a body plate or frame having means for engaging the saw teeth and a sliding gage pin for engaging the teeth to be mashed and means operatively connecting the gage pin with an indicating pointer cooperating with a calibrated dial plate showing exactly the saw teeth height.

A still further object of the invention is to provide a novel saw tool of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a top plan view of the improved tool showing the novel raker tooth gage, Figure 2 is a side elevation of the improved tool illustrating more particularly the novel raker tooth gage and showing the tool applied to the saw, the saw being shown in dotted lines, Figure 3 is a fragmentary side elevation showing the tool disassembled to illustrate the formation of a gage, part of the gage being shown in section, Figure 4 is a vertical transverse section through the tool taken on a large scale on the line 4—4 of Figure 2 looking in the direction of the arrows, illustrating the construction of the raker tooth gage, Figure 5 is a horizontal section through the same taken on the line 5—5 of Figure 4 illustrating the construction of the raker gage, Figure 6 is a detail perspective view of the indicating pointer for the registering gage illustrating the novel construction thereof, Figure 7 is a detail perspective view of the means utilized for connecting the pointer with the sliding gage pin for bringing about the operation of the pointer upon movement of said gage pin, Figure 8 is a detail perspective view of the gage pin.

Referring to the drawings in detail, wherein similar reference characters designate corresponding parts throughout the several views, the letter A generally indicates the novel saw tool, which comprises a body or frame 15 which can be formed of cast material. The frame 15 includes a body plate 16 having the laterally extending flanges 17 and 18 projecting from the upper and lower longitudinal edges on the plate. These flanges 17 and 18 project a greater distance from one side of the plate than the other, as will be hereinafter more fully described. A longitudinally extending intermediate laterally projecting flange 19 is also provided, for a purpose, which will also be described. The face of the body plate opposite to that face having the flange 19 is provided with an intermediate flange 20 of a less width than the flange 19 and this flange terminates in the same plane as the upper and lower flanges 17 and 18 formed on the mentioned side of said plate. One edge of the plate at a point intermediate the ends is provided with an inwardly directed notch 21 which terminates substantially at the flanges 19 and 20 and this notch receives the gage 25 for the raker teeth as will be hereinafter more fully described. The opposite edges of the plate is provided with a notch 22 of a less depth than the notch 21 for the reception of a gage plate 30 for cooperation with the gage 25 in order to facilitate the swaging of the teeth. The body plate on each side of the notches 21 and 22 are provided with notches 23 in order to decrease the weight of the frame and the edges of the plate receive spring steel gage and stop plates 24 and 26 which project laterally from the opposite faces of the body plate. It is to be noted that the spring plate 24 terminates directly at the notch 21, while the spring plate 26 projects slightly inward of the notch 22. These plates can be held in place by suitable fastening screws.

The raker gage member 25 includes a casing 28 which is adapted to fit directly within the notch 21 and the casing is provided with laterally projecting lugs 29 through which are adapted to extend fastening elements 31 for retaining the casing in place. The upper face of the casing carries an arcuate dial plate 33 provided with a suitable scale or graduations 34, the purpose of which will also be fully described. The casing 28 is provided with a removable front plate 35 which effectively hide the mechanism of the raker gage and this front plate is held in place by the use of suitable screws or the like 36. The top wall of the casing at one side of the graduations 34 is provided with an arcuate slot 37 through which is adapted to extend the indicating pointer 38. The indicating pointer 38 is clearly shown in Figure 6 of the drawings and is rigidly secured to a supporting shaft 39 rockably mounted within the side walls of the casing. At a point intermediate the ends of the pointer, the same is provided with a bowed portion in order to skip part of the operating mechanism which will now be described. It is to be also noted that the shaft 9 has secured thereto a slotted crank arm 41 which is in the same plane with the pointer. The upper end of the pointer is provided with an indicating hand 42 which is adapted to travel over the graduations. A second shaft 43 is rotatably mounted in the casing 28 directly above and at one side of the shaft 39 and this shaft has secured thereto a depending arm 44 carrying an arcuate leg 45 which is provided with a laterally extending pin 46 which is adapted to engage within the slotted crank 41 carried by the shaft 39. It is thus obvious that the shaft 39 and the shaft 43 are operatively connected for synchronous movement. The shaft 43 inward of the arm 44 is provided with a slotted crank arm 47 which extends at an acute angle to the arm 44. This slotted arm 47 is adapted to receive an outwardly extending pin 48 secured to an operating rod 49 which is slidably mounted within the casing. The portion of the rod 49 which carries the pin 48 is reduced as at 50 in order to snugly receive the arm 47. The operating rod 49 adjacent to its upper end also carries an outwardly projecting lug 51 which extends through a notch 52 formed in the cover plate 35. This lug 51 carries the gage pin 53 which is adapted to contact with the raker teeth. A suitable bearing lug 54 projects outwardly from the casing 28 and forms a bearing for said gage pin 53. The weight of the operating and gage pin will normally hold the same in a lowered position and the pointer at the zero mark on the scale. However when the gage pin is pressed upwardly by the raker tooth, the pointer will be rocked thereby over the scale. It can be seen that upon upward movement of the pin 53, the operating rod 49 will be raised which owing to its connection with the crank arm 37 will rock the shaft 43, which in turn owing to the connection of the arm 44 with the crank 41 will rock the shaft 39 imparting movement to the pointer. By this construction the height of the raker teeth can be accurately measured and in use of the raker tooth gage, the same is placed upon the saw with the raker teeth between the resilient steel plate 24 after which the frame is pressed downward on the saw until the saw teeth come into engagement with the said plate 24 which owing to the construction thereof will not become damaged by the teeth. This movement will raise the gage pin owing to the contacting thereof with the raker tooth. From the position of the pointer on the dial, it can be accurately determined whether the raker teeth need further swaging or not.

From the foregoing description, it can be seen that I have provided a novel saw tool of exceptionally simple and durable character, which will permit of the accurate gaging of raker teeth.

Changes in details may be made without departing from the spirit or scope of this invention but,

What I claim as new is:

1. A saw gage comprising a body plate provided at one edge with a centrally disposed notch, laterally projecting flanges formed on the mentioned edge of the plate on each side of the notch, adapted to rest upon the teeth of a saw, a raker tooth gage pin arranged upon the body between the flanges, an arcuate dial plate disposed over the notch, a pointer movable over the dial plate, and means operatively connecting the gage pin with said pointer.

2. A saw gage comprising a body, laterally extending flanges formed on one edge of the body, the body having a centrally disposed notch therein at one edge thereof, a casing arranged in the notch, a raker tooth gage pin slidably carried by the casing, an arcuate dial plate carried by the casing, a pivoted pointer movable over the dial plate, and means operatively connecting the gage pin with the pointer for moving the pointer upon sliding movement of said gage pin.

3. A saw gage comprising a body adapted to engage one side of a saw, laterally extending resilient steel plates carried by one edge of the body and adapted to project laterally therefrom for engaging the teeth of the saw, a casing arranged centrally on the body, a sliding raker tooth gage pin supported by the casing, and a rock shaft carried by the casing, a pointer secured to the rock shaft and movable within the casing, a dial plate formed on the casing for cooperation with the pointer, a second rock shaft in said casing, a crank arm formed on said second rock shaft having a slot therein, an angularly extending leg formed on said rock shaft, an arcuate arm on the outer end of said leg, means connecting the leg with the pointer, a sliding operating rod mounted within the casing, a sliding raker tooth gage pin carried by the casing and arranged exteriorly thereof and secured to the operating rod for movement therewith, and a connecting pin secured to the operating rod and mounted in the slotted portion of said crank arm.

4. A saw gage comprising a body adapted to be positioned on one side of the saw having a notch formed in one edge thereof intermediate the ends thereof, resilient plates secured to the mentioned edge extending laterally from one face of the plate for engaging the saw teeth, a casing secured in said notch having an arcuate dial plate, a rock shaft in said casing, a pointer secured to the rock shaft for movement of the dial plate, a bifurcated crank arm secured to the rock shaft in the same plane as the pointer, a second rock shaft, a radially extending arm formed on the second rock shaft, an arcuate leg secured to the outer end of said arm provided with a pin for engaging in the bifurcated crank arm, a second bifurcated crank arm secured to the rock shaft, a sliding operating rod mounted within the casing, a radially extending pin carried by said rod engaging in the second bifurcated crank arm, and a raker tooth gage pin slidably supported exteriorly of the casing and connected with the operating rod for movement therewith.

5. In a raker tooth saw gage, a flat body plate adapted to engage one face of a saw having one edge provided with an inwardly directed notch disposed intermediate the ends thereof, laterally projecting spring plates secured to the mentioned edge of the plate on each side of the notch, a casing arranged within the notch having an arcuate dial plate, a pointer movable over the dial plate, a raker tooth and gage pin slidably carried by the casing, and means for operatively connecting the raker tooth gage pin with the pointer.

In testimony whereof I affix my signature.

WILLIS W. GILDERSLEEVE.